Figure 9:
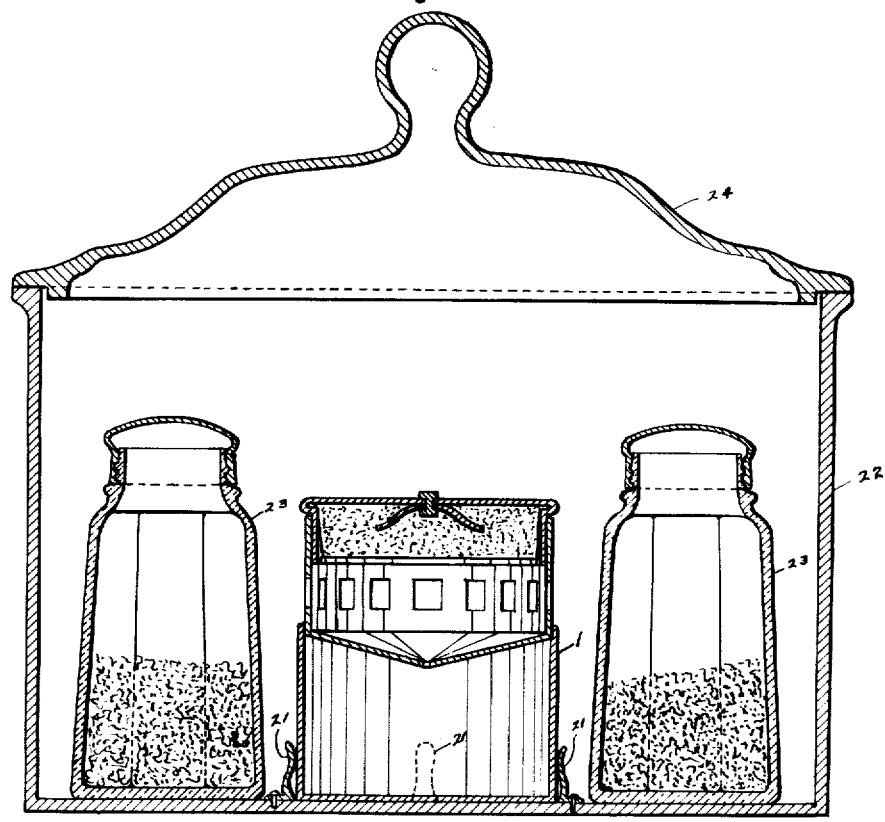

June 20, 1933.   C. R. DOWNS   1,914,941
AIR DRYING DEVICE
Filed Dec. 1, 1931   4 Sheets-Sheet 1
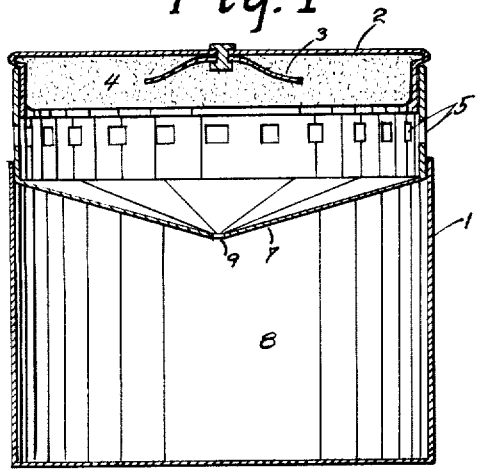
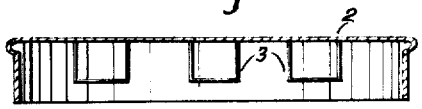
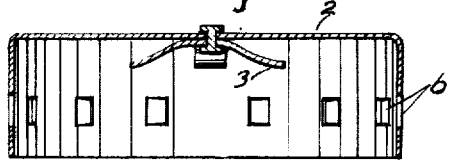
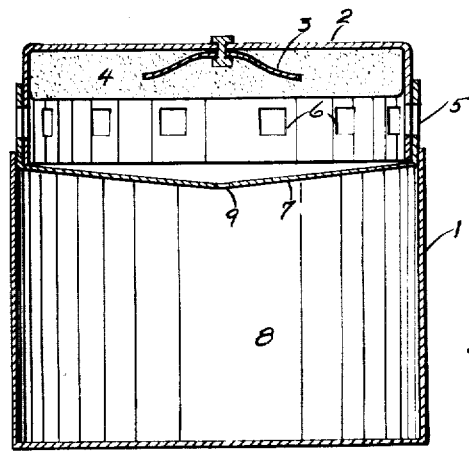
INVENTOR.
Charles R. Downs
BY
Pennie, Davis, Marvin & Edmonds
HIS ATTORNEYS

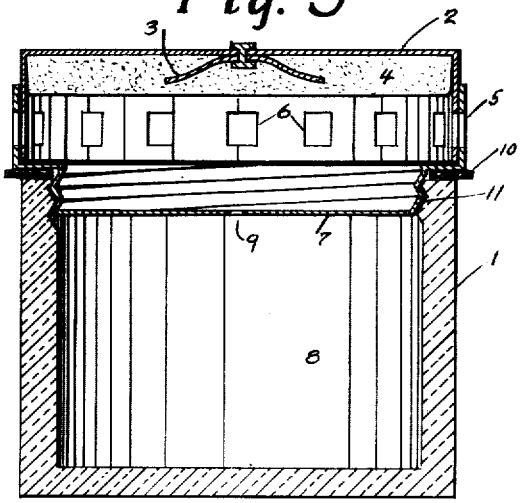
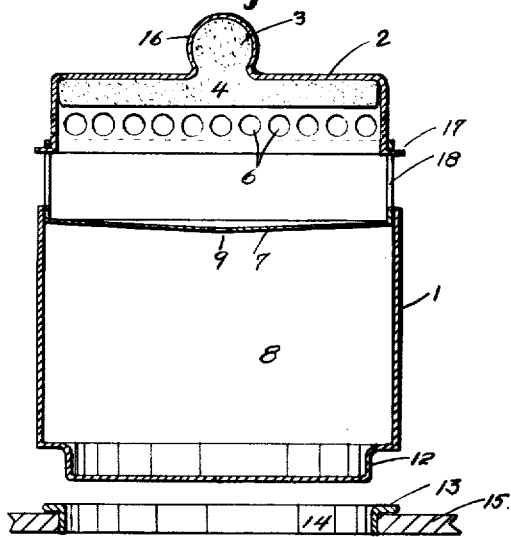
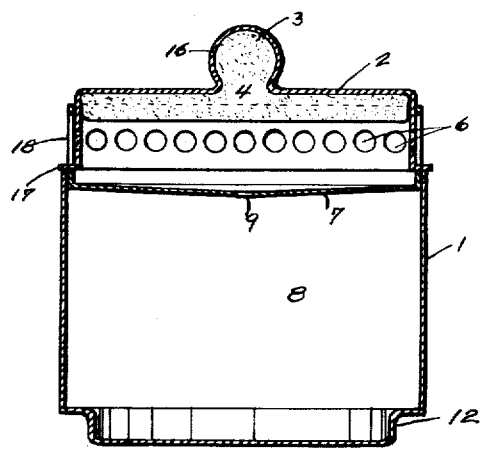

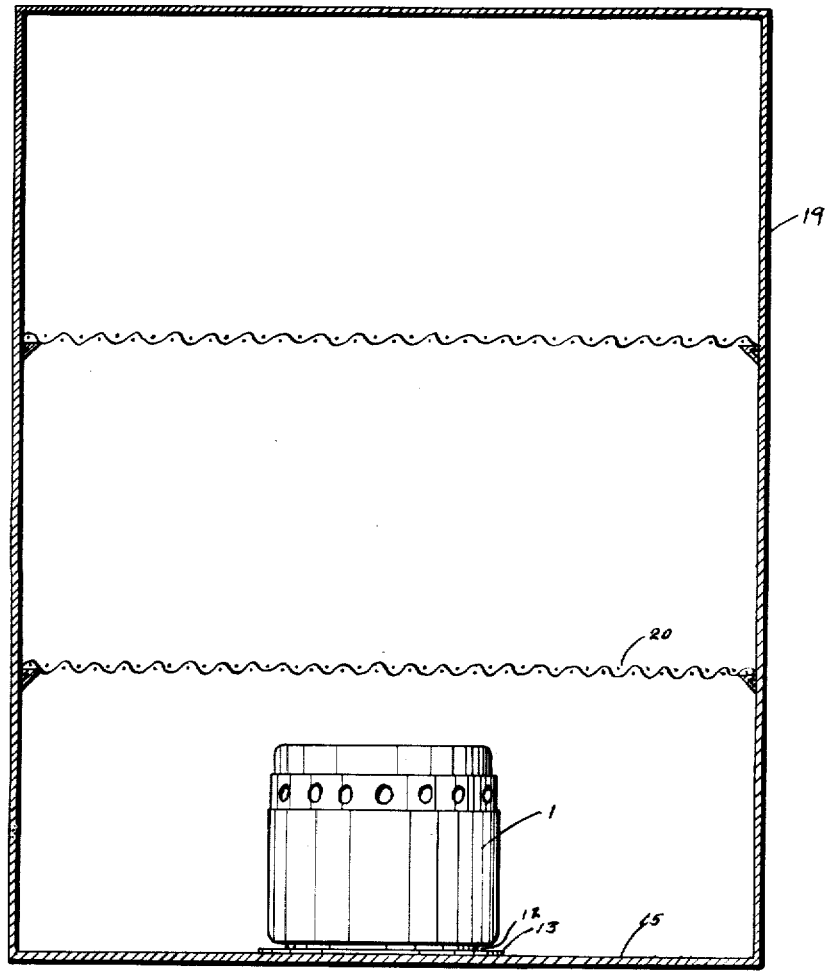

June 20, 1933. C. R. DOWNS 1,914,941
AIR DRYING DEVICE
Filed Dec. 1, 1931 4 Sheets-Sheet 4

INVENTOR.
Charles R. Downs
BY
Pennie, Davis, Marvin & Edwards
HIS ATTORNEYS.

Patented June 20, 1933

1,914,941

UNITED STATES PATENT OFFICE

CHARLES RAYMOND DOWNS, OF OLD GREENWICH, CONNECTICUT, ASSIGNOR TO WEISS AND DOWNS, INC., OF NEW YORK, N. Y., A CORPORATION OF NEW YORK

AIR DRYING DEVICE

Application filed December 1, 1931. Serial No. 578,298.

This invention relates to a moisture absorbing device that is suitable for drying air in an enclosed space to maintain dry conditions. One of the objects of my invention is to provide a simple and inexpensive device constructed and adapted to contain such a material as to cause rapid and efficient absorption of moisture within a food receptacle, cabinet, bin or the like. The device may be so constructed that it may be shipped or stored for a long time and can be made to perform its drying function after it is placed where desired.

By the present invention, moisture can be removed from materials that would be harmed thereby and the materials kept dry. These materials include, for example, foodstuffs such as cereals, potato chips, powdered sugar, salted nuts, crackers, salt, self-rising flours, tobacco, etc., which materials evidence an affinity for moisture which destroys their value or taste. These materials also include articles that are liable to rust or be injured in a damp or humid atmosphere, such as guns, leather, camera films, cloth, soap powders, etc. The moisture absorbing device may be used, for example, in stores, restaurants, factories, dwelling houses, ships, museums, laboratories, etc., wherever it is desired to keep things dry. Provision is made in its design whereby it may be used in existing receptacles for the absorption of moisture within the latter, with the result that the foodstuffs or other material contained within the receptacle are dried and kept dry so as to be always ready for consumption or use. However, I prefer to use it in conjunction with a food cabinet, container or other receptacle, especially designed so that it forms a component part of a drying system.

To clearly understand the principles of construction and operation of the moisture absorbing device and its function as a component of a drying apparatus, reference will be made to the accompanying drawings. It is however understood that the construction and arrangement of parts shown in the drawings are for illustrative purposes only, since various modifications may be used without departing from the spirit and scope of the invention.

Referring to the drawings, Figure 1 is a vertical section through an illustrative embodiment of the invention; Figure 2 shows a vertical section of a modified form of cover from that shown in Figure 1. Figure 3 is the vertical section through the cover shown in Figure 4, which in turn is a vertical section through another modified form of the moisture absorbing device. Figures 5, 6, and 7 are vertical sections through still other modifications, illustrating my invention. Figures 8 and 9 are vertical sections illustrating the moisture absorbing device as a component of drying apparatuses.

In the drawings, reference character 1 indicates a moisture absorbing device; 2, a cover for the device, said cover confining an upper compartment; 3, an anchorage for a cake of deliquescent material; 4, a deliquescent material; 5, perforations in the wall of the upper compartment; 6, perforations in cover, 2; 7, a partition; 8, a liquid collecting compartment; and 9, an opening in the partition, 7.

I will now discuss the arrangement of parts in the moisture absorbing device, and their function. Referring to Figures 1 and 2, the reference character 4 represents a cake of deliquescent material which may be calcium chloride or other deliquescent material. It is fastened into the cover, 2, by means of the spider or loops, 3, which may be removable. The deliquescent material, 4, may be fused and cast into the cover, 2, with the loops or spiders in place, merely by inverting the cover, the latter to act as a mold during casting. It solidifies on cooling. The deliquescent material may also be cast in a separate mold after which the solid cake is attached to the underside of the cover. Perforations, 5, are placed in the wall of the upper compartment below the lower surface of the deliquescent material, 4, so that the moisture laden air may circulate through this compartment. The moisture is then removed from the air when the latter contacts with the lower surface of the cake of deliquescent material. These perforations are closed during shipment and storage by any suitable removable means in addition to the arrangements shown in Figures 3, 4, 5, 6 and 7, to be described later.

The moisture removed from the moist air is absorbed by the deliquescent material causing the latter to deliquesce. It then drips away and falls onto the horizontally placed partition, 7, which may be flat, inverted, conical, or concave in section, and the said deliquesced material then flows toward the small opening or cluster of small openings, 9, to drain into the liquid collecting compartment, 8. The action and function of this opening in conjunction with the otherwise air-tight compartment, 8, are two-fold. First, under ordinary conditions of use there are appreciable changes in atmospheric temperature from period to period during the day. When a slight amount of deliquesced material rests upon the partition, 7, covering the opening, 9, any increase in temperature will expand the air in compartment, 8, whereby air bubbles escape through the liquid covering the opening, 9. On a subsequent decrease in temperature and consequent lowering of the air pressure in compartment, 8, some liquid will be drawn through the opening, 9. The volume of compartment, 8, must be at least equal to the volume of the completely deliquesced material but as a practical matter, I prefer to have the volume of compartment, 8, considerably larger in order to provide a large relative change in the volume of air confined therein per degree change in temperature. Secondly, the opening or a cluster of small openings, 9, centrally located, should be of relatively small area so as to prevent sudden spilling of the deliquesced material collected in compartment, 8, should the moisture absorbing device be accidentally tilted or momentarily upset. Spilling is prevented by the combination of the opening of small area with an otherwise air-tight compartment, 8, in that the outside air pressure is made effective. With calcium chloride, for example, openings each not exceeding an area of 0.05 sq. in. have been found suitable.

In Figures 1 and 2, means, for example, a strip of adhesive tape, for closing the perforations, 5, in the wall of the upper compartment must be provided. However, Figures 3, 4, 5, 6 and 7 pertain to a modification of my invention in which means for closing these perforations are shown as an integral part of the moisture absorbing device. Figures 3, 4, and 5 show the cover, 2, itself, provided with perforations, 6. During the use of the device, perforations, 6, coincide with perforations, 5, in the wall of the upper compartment. This position is shown in Figures 4 and 5. When the perforations, 6, of both the cover, 2, and the perforations, 5, in the wall of the upper compartment are in such coincidence, moist air can flow into the device. However, during shipment and storage, at which times moist air must be excluded, a fraction of a turn of the cover, 2, will cause the perforations, 5 and 6, to move from coincidence and cover the blank spaces between the perforations, thereby sealing the moisture absorbing device. The operation of the closure of the perforations as shown in Figures 3, 4, and 5 require a cylindrical body for the moisture absorbing device but if it is desirable to employ some other shape as, for example, rectangular, the moisture absorbing device shown in Figures 6 and 7 may be used. In this modification, the cover, 2, telescopes in a vertical manner into the remainder of the device and is guided by horizontal extensions, 17, sliding within the slots, 18, or by a suitable bead and groove arrangement, so that when the cover is in its uppermost position shown in Figure 6, perforations, 6, are exposed and open, allowing moisture laden air to enter the device. On the other hand, when the cover is in its lowermost position, as in Figure 7, the perforations, 6, are covered by a skirt extending above the lower compartment.

Figures 6 and 7 also illustrate another modification in cover design. The upper section of the cover is formed into a projecting hollow protuberance, preferably in the form of a knob, 16, which indicates the top of the device and prevents the user from setting the moisture absorbing device on the wrong end. In addition, this knob may be used for anchoring the cake of deliquescent material by casting the latter into the knob when the main cake is formed.

Figures 6 and 7 also illustrate the means for attaching the moisture absorbing device within a cabinet. These means consist of an extension, 12, made to fit a ring, 13, which is fitted to an opening, 14, in the wall, 15, of a cabinet. This combination of elements permits easy attachment and detachment of the device and yet affords a strong and substantial method of holding the device in place during use and shipment.

Figure 5 shows a modification of the moisture absorbing device, in which the liquid containing compartment, 8, is made of glass or synthetic resin material, preferably transparent or translucent. In this modification, a gasket, 10, and a screw joint, 11, are used for fastening the bottom portion of the drying device to the top portion.

One of the many advantages of my invention is that fresh surfaces of the deliquescent material are continuously exposed to the moisture laden air flowing into the upper compartment, due to the fact that the deliquesced material drains away immediately and is confined in the liquid collecting compartment, 8. This greatly increases the drying efficiency.

Figure 8 shows the moisture absorbing device, 1, fixed in position in the bottom of a drying cabinet, 19, by means of a friction joint. This cabinet may be provided with the usual door or doors (not shown). Reference character 20 illustrates a perforated or wire screen shelf or plurality of shelves which must be foraminous or reticulated in order to provide adequate circulation of the atmosphere in the drying cabinet, 19. In the friction joint used for attaching the moisture absorbing device to the floor of the cabinet and illustrated in Figure 6, the floor, 15, of the cabinet is cut away inside the ring, 13. When the deliquescent material in the moisture absorbing device has completely liquefied, the latter is detached from the ring, 13, and a new moisture absorbing device inserted, thereby closing up the hole in the floor, 15. Instead of attaching the moisture absorbing device to the bottom of the cabinet, 19, attachment may be made to any vertical wall, door or to the top by a suitable location of the attaching means on the moisture absorbing device and drying apparatus. In place of the friction joint method of attachment as illustrated, other separable attaching means may be employed. The drying apparatus, 19, may be a case, food cabinet, refrigerator or any other receptacle in which food or other articles to be dried or kept dry are placed.

This moisture absorbing device is also especially useful for maintaining table salt contained in salt cellers in a dry and readily pourable state even under the most humid atmospheric conditions. The ease with which salt deliquesces thereby preventing its sifting from cellers is well known and very aggravating. Figure 9 shows the moisture absorbing device as an integral part of a receptacle to be used especially for maintaining salt in a dry condition. In this figure, the moisture absorbing device, 1, is held in a fixed position by the clamps, 21, attached to the bottom of the receptacle, 22. In the same figure, reference character, 23, represents salt cellers while 24 is a removable cover of the receptacle. When the cake of drying material in the moisture absorbing device is consumed, it is only necessary to remove the latter and insert a fresh moisture absorbing device in the clamps.

The moisture absorbing device, and also the drying cabinet or apparatus, 19, may be made of sheet metal or other material, and in any desired form as, for example, they may be circular, square, rectangular, etc.

Having thus described my invention, I claim:

1. A moisture collecting device comprising a receptacle providing a compartment to receive collected moisture, a solid mass of deliquescent material, means for supporting the deliquescent material with its upper surface out of contact with air and its lower surface exposed above the compartment, the receptacle having an opening communicating with the lower surface of the solid deliquescent material permitting access of air from the surrounding atmosphere, and a horizontally disposed diaphragm spaced below the deliquescent material forming the upper boundary of the compartment, said diaphragm having a passage through which liquid accumulating on the diaphragm may pass, said passage being sufficiently small so that the liquid in said compartment is removed from contact with the air to be dried and said passage being too small for the liquid to run out when the device is turned upside down.

2. A moisture collecting device comprising a receptacle providing a compartment to receive collected moisture, a solid mass of deliquescent material, means for supporting the deliquescent material with its lower surface exposed above the compartment, the receptacle having an opening communicating with the lower surface of the solid deliquescent material permitting access of air from the surrounding atmosphere, and a horizontally disposed diaphragm below the deliquescent material forming the upper boundary of the compartment, said diaphragm having a passage through which liquid accumulating on the diaphragm may pass, the supporting means for the deliquescent material being adjustably mounted on the receptacle and movable to close the opening therein.

3. A moisture collecting device comprising a receptacle providing a compartment to receive collected moisture, a solid mass of calcium chloride, means for supporting the calcium chloride with its lower surface exposed above the compartment, the receptacle having an opening communicating with the lower surface of the solid calcium chloride permitting access of air from the surrounding atmosphere, and a horizontally disposed diaphragm below the calcium chloride forming the upper boundary of the compartment, said diaphragm having a passage through which liquid accumulating on the diaphragm may pass, the supporting means for the calcium chloride being adjustably mounted on the receptacle and movable to close the opening therein.

4. A moisture collecting device comprising a receptacle providing a compartment to receive collected moisture, a solid mass of deliquescent material, means for supporting the deliquescent material with its upper surface out of contact with air and its lower surface exposed above the compartment, the receptacle having an opening communicating with the lower surface of the solid deliquescent material permitting access of air from the surrounding atmosphere, and a horizontally disposed diaphragm spaced below the deliquescent material forming the upper boundary of the compartment, said diaphragm having a passage which is too small for liquid to pass therethrough by gravity alone but which is sufficiently large for liquid to pass into said compartment by the thermal breathing of the air contained therein.

5. A moisture collecting device comprising a receptacle providing a compartment to receive collected moisture, a solid mass of calcium chloride, means for supporting the calcium chloride with its upper surface out of contact with and its lower surface exposed above the compartment, the receptacle having an opening communicating with the lower surface of the solid calcium chloride permitting access of air from the surrounding atmosphere, and a horizontally disposed diaphragm spaced below the calcium chloride forming the upper boundary of the compartment, said diaphragm having a passage through which the liquid accumulating on the diaphragm may drain, said passage being too small for liquid calcium chloride to pass therethrough by gravity alone but which is sufficiently large for liquefied calcium chloride to pass into said compartment by the thermal breathing of the air contained therein.

In testimony whereof I affix my signature.

CHARLES RAYMOND DOWNS.

---

CERTIFICATE OF CORRECTION.

Patent No. 1,914,941.                                            June 20, 1933.

CHARLES RAYMOND DOWNS.

It is hereby certified that error appears in the printed specification of the above numbered patent requiring correction as follows: Page 4, line 11, claim 5, after "with" insert "air"; and that the said Letters Patent should be read with this correction therein that the same may conform to the record of the case in the Patent Office.

Signed and sealed this 22nd day of August, A. D. 1933.

M. J. Moore.

(Seal)                                                    Acting Commissioner of Patents.

having a passage which is too small for liquid to pass therethrough by gravity alone but which is sufficiently large for liquid to pass into said compartment by the thermal breathing of the air contained therein.

5. A moisture collecting device comprising a receptacle providing a compartment to receive collected moisture, a solid mass of calcium chloride, means for supporting the calcium chloride with its upper surface out of contact with and its lower surface exposed above the compartment, the receptacle having an opening communicating with the lower surface of the solid calcium chloride permitting access of air from the surrounding atmosphere, and a horizontally disposed diaphragm spaced below the calcium chloride forming the upper boundary of the compartment, said diaphragm having a passage through which the liquid accumulating on the diaphragm may drain, said passage being too small for liquid calcium chloride to pass therethrough by gravity alone but which is sufficiently large for liquefied calcium chloride to pass into said compartment by the thermal breathing of the air contained therein.

In testimony whereof I affix my signature.
CHARLES RAYMOND DOWNS.

---

CERTIFICATE OF CORRECTION.

Patent No. 1,914,941.  June 20, 1933.

CHARLES RAYMOND DOWNS.

It is hereby certified that error appears in the printed specification of the above numbered patent requiring correction as follows: Page 4, line 11, claim 5, after "with" insert "air"; and that the said Letters Patent should be read with this correction therein that the same may conform to the record of the case in the Patent Office.

Signed and sealed this 22nd day of August, A. D. 1933.

M. J. Moore.

(Seal)  Acting Commissioner of Patents.

CERTIFICATE OF CORRECTION.

Patent No. 1,914,941.　　　　　　　　　　　　　　　　June 20, 1933.

CHARLES RAYMOND DOWNS.

It is hereby certified that error appears in the printed specification of the above numbered patent requiring correction as follows: Page 4, line 11, claim 5, after "with" insert "air"; and that the said Letters Patent should be read with this correction therein that the same may conform to the record of the case in the Patent Office.

Signed and sealed this 22nd day of August, A. D. 1933.

M. J. Moore.

(Seal)　　　　　　　　　　　　　　　　Acting Commissioner of Patents.